United States Patent [19]

Ferreira

[11] Patent Number: 5,448,467
[45] Date of Patent: Sep. 5, 1995

[54] ELECTRICAL POWER CONVERTER CIRCUIT

[76] Inventor: Jan A. Ferreira, 25 Silver Pine Ave., Ruiterhof, Randburg, Transvaal, South Africa

[21] Appl. No.: 45,179

[22] Filed: Apr. 13, 1993

[30] Foreign Application Priority Data

Apr. 13, 1992 [ZA] South Africa ................ 92/2686

[51] Int. Cl.⁶ ........................................ H02M 5/458
[52] U.S. Cl. ..................... 363/17; 363/132; 363/136
[58] Field of Search ............. 363/17, 98, 132, 136, 363/27, 96

[56] References Cited

U.S. PATENT DOCUMENTS 4,017,784 4/1977 Simmons et al.

FOREIGN PATENT DOCUMENTS 63-15665 1/1988 Japan.
4-117174 4/1992 Japan.
2070350 9/1981 United Kingdom.

OTHER PUBLICATIONS

Practical Switching Power Supply Design, Marty Brown, pp. 119-125, Copyright 1990.
Zero Voltage Switching Technique in High Frequency Off Line Converters, Jovanovic et al., IEEE, 1988, pp. 23-32.
IEEE Power Electronic Symposium, "Pseudo-Resonant Full Bridge DC/DC Converter", Patterson et al., Jun. 21-26, 1987, pp. 424-430.
Article: "Capacitor Voltage Clamped Series Resonant Power Supply With Improved Cross Regulation", Agrawal et al, 1989 IEEE (pp. 1141-1146).
Article: "Characteristics of a New Series-Resonant Converter With a Parallel Resonant Circuit", Kuwata et al, 1987 IEEE (pp. 204-210).
Article: "An Improves Method of Resonant Current Pulse Modulation for Power Converters", Schwarz, 1976 IEEE (pp. 133-141).

*Primary Examiner*—Steven L. Stephan
*Assistant Examiner*—Shawn Riley
*Attorney, Agent, or Firm*—Burns, Doane, Swecker & Mathis

[57] ABSTRACT

The invention relates to a series-resonant converter circuit, which includes a capacitive energy storage network coupled to an inductive energy storage network for supplying a load. A current switching network comprising a pair of controlled switches is provided for switching the converter circuit between discrete successive cycles. Voltage clamping means, such as a pair of clamping diodes, are used to control the magnitude and polarity of the voltage across the capacitive energy storage network. A freewheel inductance is arranged to supply freewheel current for allowing zero voltage switching of the controlled switches at a switching frequency which is less than the resonant frequency of the resonant tank. At least one snubber capacitance is shunted across the controlled switches for reducing turn-off switching losses, the freewheel inductance being arranged to discharge into the snubber capacitance during a resonant transition interval just prior to turn-on of the controlled switch for equalizing the voltage across the switch and allowing zero voltage turn-on. The invention extends to a method of operating a circuit of this type.

11 Claims, 6 Drawing Sheets

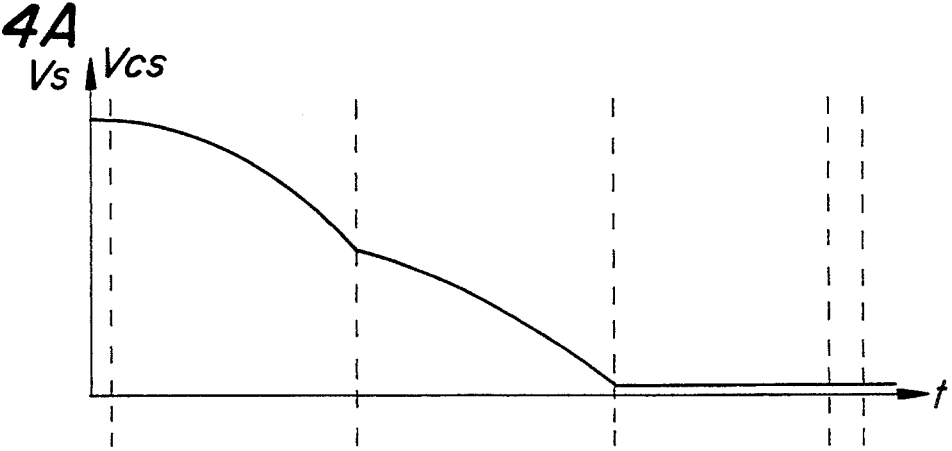
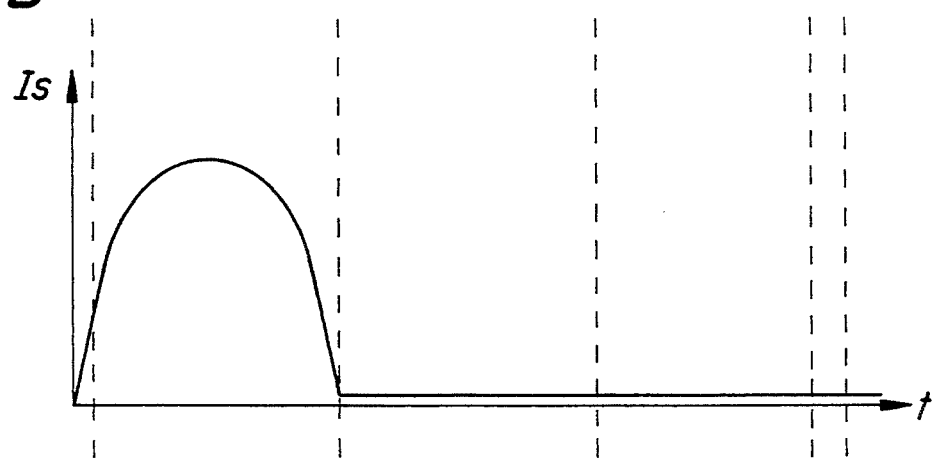
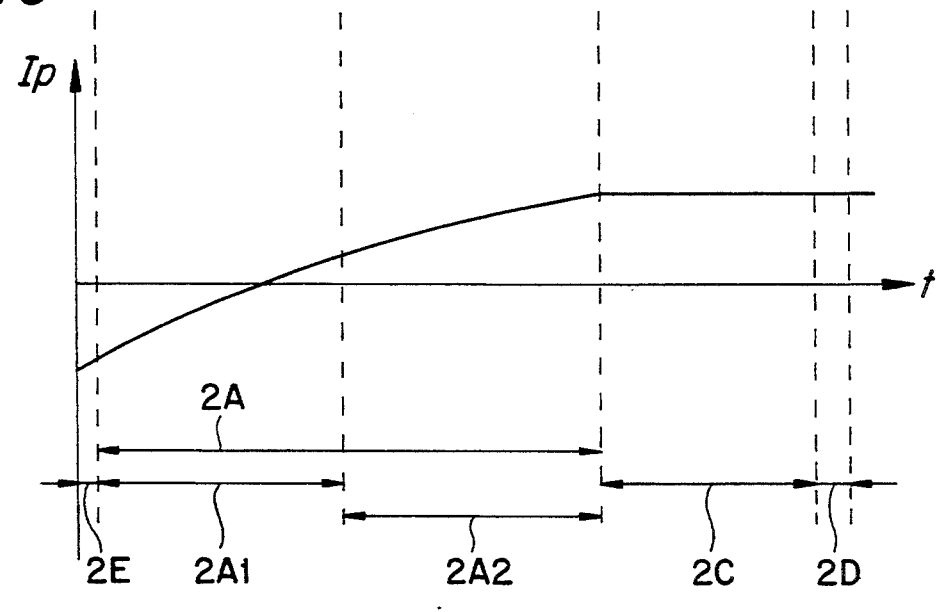

ELECTRICAL POWER CONVERTER CIRCUIT

BACKGROUND TO THE INVENTION

This invention relates to an electrical power convertor circuit.

Electrical power convertor circuits typically comprise a transformer with primary and secondary windings to match a load to a power source. Semiconductor switches control the flow of current from the power source into the primary windings. A control circuit modulates the semi-conductor switches, thereby controlling the current through the transformer primary. The primary and secondary windings are disposed in the transformer to effect desired coupling. An output rectifier and/or filter conditions the current flowing from the secondary to the load.

In order to improve operating efficiency and to achieve a higher operating frequency than is normally possible with "hard switching" or pulse-width modulated convertors, a series resonant configuration is employed, in which inductive properties of the transformer are made to resonate deliberately with series connected capacitive elements in the convertor circuit.

One type of series resonant convertor, used as a DC to DC convertor, is described in detail in the paper "Modelling The Full-Bridge Series-Resonant Convertor" by R. J. King and T. A. Stuart which appeared in the IEEE Transactions on Aerospace and Electronic Systems, Vol. AES-18, No. 4, July 1982, pp. 449–459. A half-bridge version of this full-bridge convertor employing a centre-tapped resonant capacitor is described by FC Schwartz in "An Improved Method of Resonant Current Pulse Modulation for Power Convertors", IEEE Transactions on Industrial Electronics and Control Instrumentation, Vol. IEI-23, No. 2, May 1976, pp 133–141.

A primary advantage of the series resonant convertor is that it permits higher switching frequencies than are normally possible with the commonly used pulse width modulated convertor. This makes it suited to aerospace applications, as higher switching frequencies facilitate the use of smaller transformers, inductors and capacitors, thereby reducing the volume and mass of the convertor.

It is possible to operate a series-resonant convertor at a rate either above or below the resonant frequency determined by the resonant frequency of the resonant inductor and capacitor. If the convertor circuit is operated below the resonant frequency, the current naturally goes to zero owing to the natural oscillation of the circuit, and turn-off of the circuit at the zero crossing point or shortly thereafter is completely stress-free and is known as zero current switching. In this mode of operation, while turn-off of the one semiconductor switch is relatively loss-free, turn-on of the next semiconductor switch results in significant losses due to the voltage and current appearing simultaneously across the switch at the time of turn-on. The addition of snubber capacitors across the semiconductor switches increases the severity of the turn-on losses. Even the internal capacitance of semiconductor switching devices such as MOSFETS can cause turn-on losses which are sufficient to restrict operation of the circuit.

If the series-resonant convertor circuit is operated above resonant frequency, the switches are turned off while current is still flowing through them. In this case, snubber capacitors can be shunted across the switches so as to reduce turn-off losses. The inductive current at turn-off charges and discharges these capacitors, and subsequently flows through freewheel diodes which may similarly be shunted across the switches, thereby equalising the voltage across the switches at turn-on, which results in zero voltage switching.

One version of a zero current switching convertor is described in the paper "Capacitor Voltage Clamp Series Resonant Power Supply With Improved Cross Regulation" by J. P. Agrawal et al, IEEE-IAS Annual Meeting of 1989, pp 1141 to 1146. In the circuit, the freewheel diodes are removed from across the controlled switches to a position in which they act as clamping diodes across a pair of capacitors making up the resonant circuit. This circuit has the advantage in that turn-on losses due to diode reverse recovery are eliminated. A concomitant disadvantage is that the resonant current peak increases in inverse proportion to the output voltage. Furthermore, the switching frequency decreases at reduced loading and output voltage. A solution to this problem has been proposed in the paper "Characteristics of a New Series-Resonant Convertor with a Parallel Resonant Circuit" by Kuwata et al, at the 1987 Intelec '87 Conference in Stockholm. A parallel-resonant circuit with a resonant frequency of over 20 kHz is installed in series with the load circuit. The output voltage is thus regulated by varying the conversion frequency in a higher area than that of a conventional series-resonant convertor. This circuit still suffers from significant turn-on losses.

SUMMARY OF THE INVENTION

According to a first aspect of the invention there is provided a series-resonant convertor circuit comprising:
   a) a resonant tank including a capacitive energy storage network coupled to an inductive energy storage network for supplying a load;
   b) a current switching network comprising a pair of controlled switches for switching the convertor circuit between discrete successive cycles;
   c) voltage clamping means for controlling the magnitude and polarity of the voltage across the capacitive energy storage network; and
   d) a freewheel inductance being arranged to supply freewheel current for allowing zero voltage switching of the controlled switches at a switching frequency which is less than the resonant frequency of the resonant tank.

Preferably, the inductive energy storage network comprises the freewheel inductance shunted to a series inductance, and the voltage clamping means, in combination with the freewheel inductance and a selected one of the controlled switches, defines a freewheel network for allowing circulation of the freewheel current.

Conveniently, the convertor circuit includes at least one snubber capacitance shunted across the controlled switches for reducing turn-off switching losses, the freewheel inductance being arranged to discharge into the snubber capacitance during a resonant transition interval just prior to turn-on of the controlled switch for equalizing the voltage across the switch and allowing zero voltage turn-on.

The capacitive energy storage network preferably comprises a pair of serially linked capacitors, and the voltage clamping means comprises a clamping diode shunted across each capacitor.

In one form of the invention, the freewheel inductance is arranged to supplement the series inductance in completely discharging and charging the capacitive energy storage network over each cycle of operation, thereby to allow complete excursion of a supply voltage across the inductive energy storage network.

According to a further aspect of the invention there is provided a method of operating a series resonant convertor which comprises a capacitive energy storage network coupled resonantly to an inductive energy storage network which includes a freewheel inductance and a current switching network having a pair of controlled switches arranged to switch the convertor circuit between discrete successive cycles at a switching frequency which is less than the resonant frequency of the series resonant convertor, one cycle including:

a) a resonant interval during which the capacitive energy storage network discharges into the inductive energy storage network and the load;

b) a freewheel interval, during which freewheel current discharged from the freewheel inductance circulates around a predetermined freewheel current path;

c) a resonant transition interval, during which the freewheel current is discharged into a capacitance existing across one of the controlled switches for facilitating zero voltage turn-on of the switch.

One cycle conveniently includes a regenerative interval, in which energy stored in the inductive network is fed back to the supply for increasing switching frequency and for reducing current through the controlled switches.

The one cycle may further include a discharge interval, in which that part of the energy stored in the inductive energy storage network which is not stored in the freewheel inductance discharges into the load.

BRIEF DESCRIPTION OF THE DRAWINGS

FIGS. 4A to 4C show waveform diagrams illustrating a further embodiment of half of an operating cycle of the convertor under conditions of high output voltage.

DESCRIPTION OF EMBODIMENTS

Figure 1:
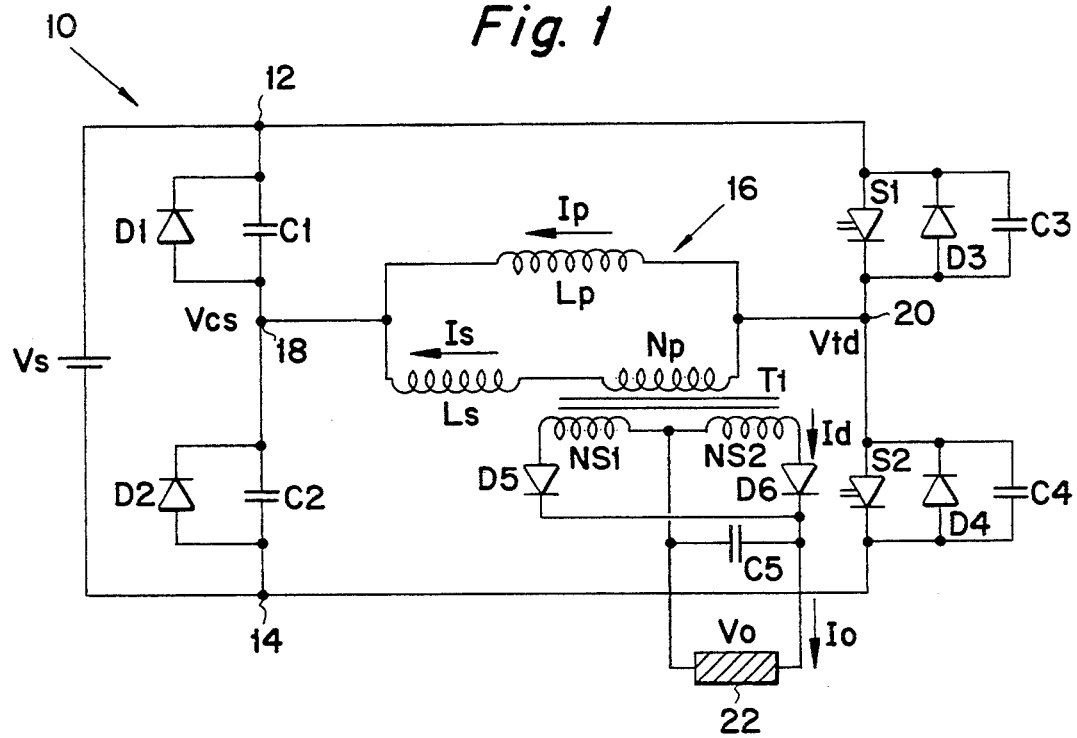
FIG. 1 shows a schematic diagram of a DC to DC partial series-resonant convertor circuit of the invention.

The convertor circuit 10 illustrated in FIG. 1 comprises a DC input supply voltage Vs having input terminals 12 and 14 bridged by a capacitive storage network in the form of resonant capacitors C1 and C2. Clamping diodes D1 and D2 are shunted across the respective capacitors C1 and C2. An inductive network 16 has an input node 18 located between the capacitors C1 and C2 in the capacitive storage network and output node 20 connected between the controlled switches S1 and S2.

The common node 18 of C1, C2, D1 and D2 assumes a voltage Vcs with respect to the negative terminal of Vs. The resonant capacitors C1 and C2 are assigned values ranging from 1 $\mu$F to 100 $\mu$F, and typically from 1 $\mu$F to 10 $\mu$F, which is small enough to allow the voltage Vcs to swing from zero to Vs in one half cycle and back again from Vs to zero during the second half cycle of the cyclic operation of the convertor. The combined action of the diodes D1 and D2 serves to ensure that the voltage range of Vcs is clamped to the value of Vs, thereby passively limiting the voltage across the capacitors C1 and C2. In the absence of diodes D1 and D2, active control would be necessary to control the voltage Vcs and to limit it to acceptable levels should C1 and C2 be small enough to permit resonant operation, as is the case of this invention.

Other similar circuit topologies exist in which C1 and C2 are so large that Vcs does not vary much during a cycle, typically by less than 20% of the supply voltage Vs. Such topologies would normally not have diodes D1 and D2 in the circuit, and capacitors C1 and C2 would function as smoothing capacitors, leading to substantial difference in operation.

A pair of controlled semi-conductor switches S1 and S2 are also shunted across the input terminals 12 and 14. The switches may be chosen from a variety of semi-conductor switches, including bi-polar transistors, IGBT's MOSFET's and GTO's. Freewheel diodes D3 and D4 are connected in anti-parallel across the respective switches S1 and S2.

Snubber capacitors C3 and C4, which typically have values ranging from 0.1 nF to 10 nF in equipment operating from a mains supply, are also shunted across the switches S1 and S2, and are sized to increase the time it takes for the voltage Vtd at node 20 to change from zero to the value of the supply voltage Vs or vice versa, when referred to the negative terminal of the supply voltage Vs. The time interval is typically between one to ten times the current fall time of switches S1 or S2 at turn-off. The snubber capacitors C3 and C4 therefore allow the switches S1 and S2 to be turned off when current is still flowing and achieve acceptable turn-off losses to as to allow operation at ultrasonic switching frequencies.

The inductive network 16 includes a series inductor Ls and the primary winding Np of a transformer T1 connected in series. A freewheel inductor Lp is shunted across the inductor Lp is approximately ten times that of the value of the series inductor Ls. The freewheel inductor Lp functions to provide a current which charges the snubber capacitors C3 and C4 just prior to turn-on of their associated switches S1 and S2, so as to achieve zero voltage turn-on of the switches. In zero current switching topologies, the preferred absence of inductive current at turn-off results in turn-on losses arising from the inherent structural capacitance in the switches. At low output voltages, referred to the primary of typically less than half of the supply voltage Vs, the resonance between the inductor Ls and the combined capacitance of capacitors C1 and C2 dominates. At high output voltages, of typically more than half Vs, the resonance between the inductor Lp and the combined capacitance of capacitors C1 and C2 dominates. Since the inductor Lp is larger than inductor Ls, the resonant time interval is longer at higher output voltages.

The convertor circuit 10 powers a DC load 22, which may be in the form of any electrical load such as a DC machine, a resistive load, electronic circuitry, an array of batteries or arc discharges. The DC load 22 is connected in parallel to a filter capacitor C5, which as a guideline should be large enough to ensure that the an AC ripple of preferably less than 20% of the output DC voltage is present on capacitor C5. The filter capacitor C5 is supplied by current from a rectifier bridge which comprises diodes D5 and D6 connected to a centre tap secondary of transformer T1 having windings $Ns_1$ and $Ns_2$. Alternatively, the transformer output may be rectified using a full bridge rectifier fed by a single secondary winding. The rectifier diodes may optionally be left out and the transformer output may be fed directly to an AC load.

Figure 2A:
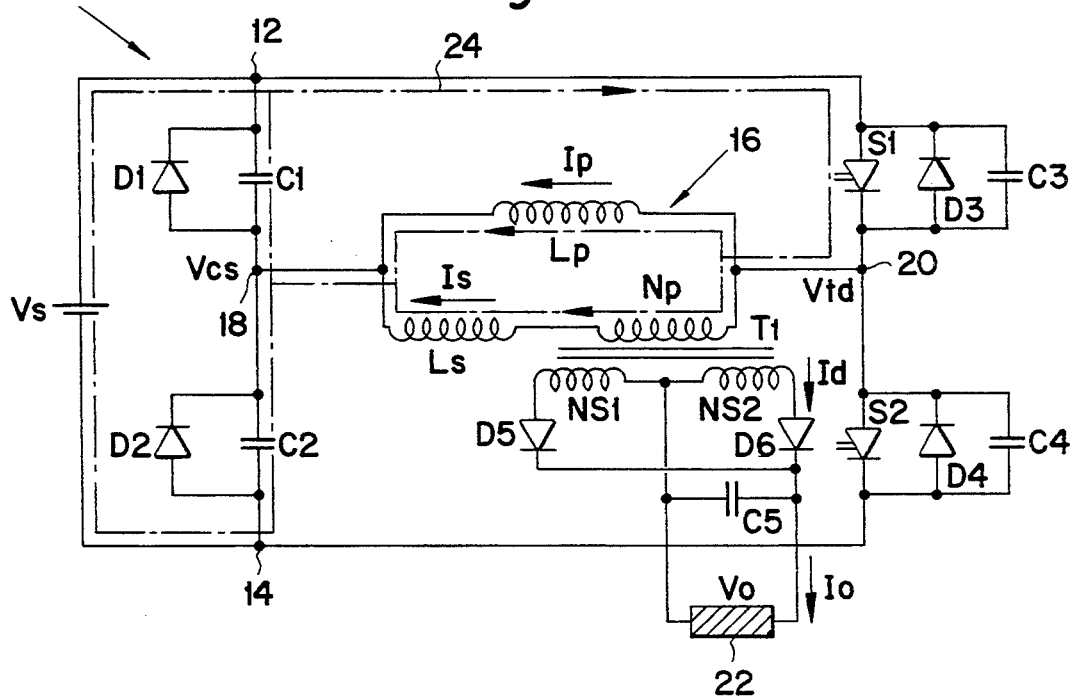
FIGS. 2A to 2E show current paths in the circuit of FIG. 1 during various intervals of operation.

The various intervals which may occur during a cycle of operation of the convertor circuit will now be described with reference to FIGS. 2A to 2E. In FIG. 2A, a current path 24 illustrates current flow during a resonant interval, in which switch S1 is on and the capacitor network comprising the capacitors C1 and C2 discharge into the inductive network 16 and the load 22. During this interval, a resonant condition exists between the capacitive network and the inductive network 16.

Figure 2B:
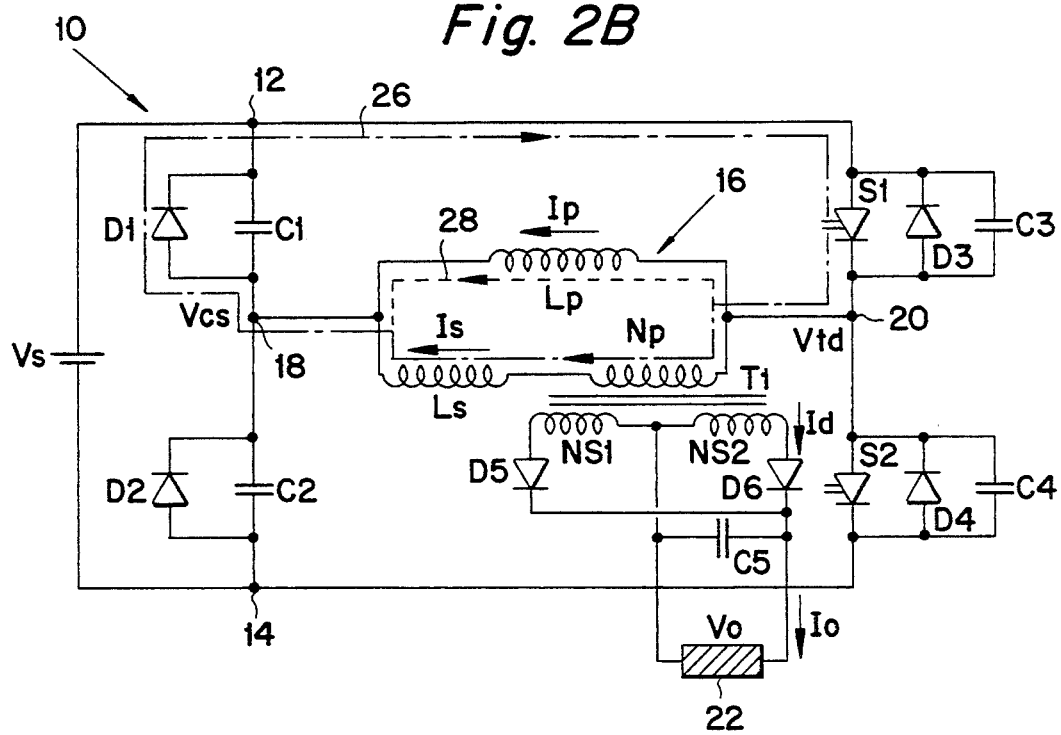

In FIG. 2B, a current flow during a discharge interval is indicated by a current path 26. During this interval, the energy stored in the series inductor Ls discharges into the load. Some of the current passes through the freewheel inductor Lp, as is shown in broken outline at 28. This current freewheels through the diode D1 and the switch S1.

Figure 2C:
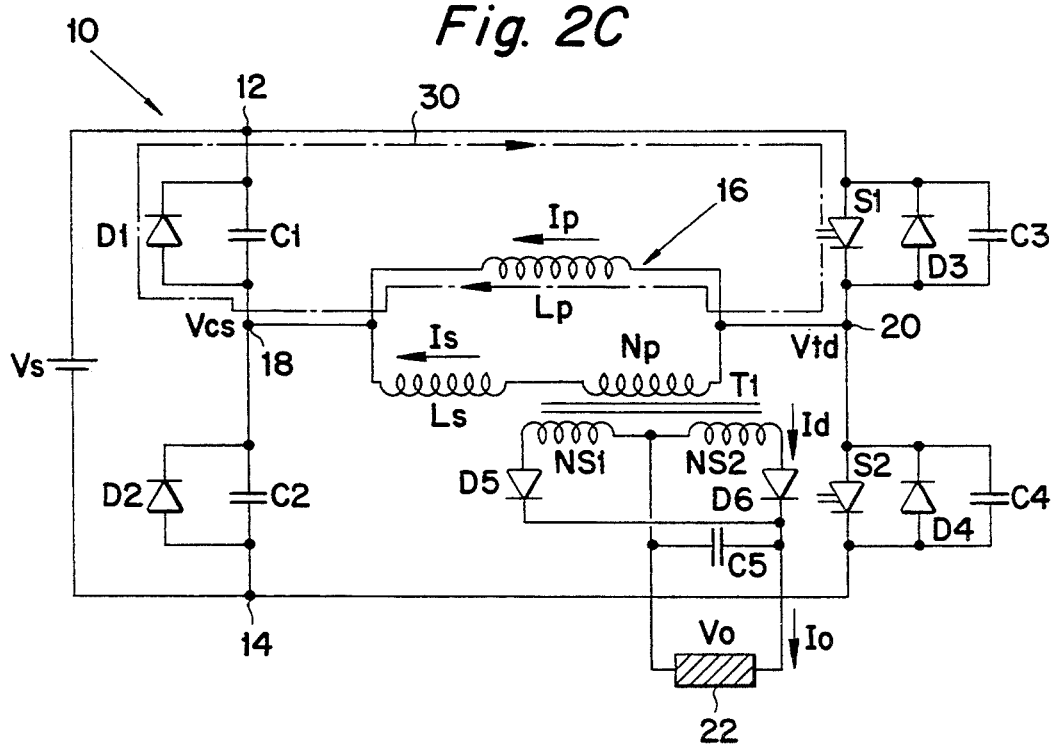

In FIG. 2C, a freewheel interval is characterized by the sole existence of a freewheel current path 30, in which a relatively small voltage is maintained over the freewheel inductor Lp. A circulating freewheel current Ip freewheels through the freewheel inductor Lp, the diode D1 and the closed switch S1. This current Ip decays relatively slowly, and is used to achieve zero voltage turn-on of the switch S2 in a subsequent resonant transition interval.

Figure 2D:
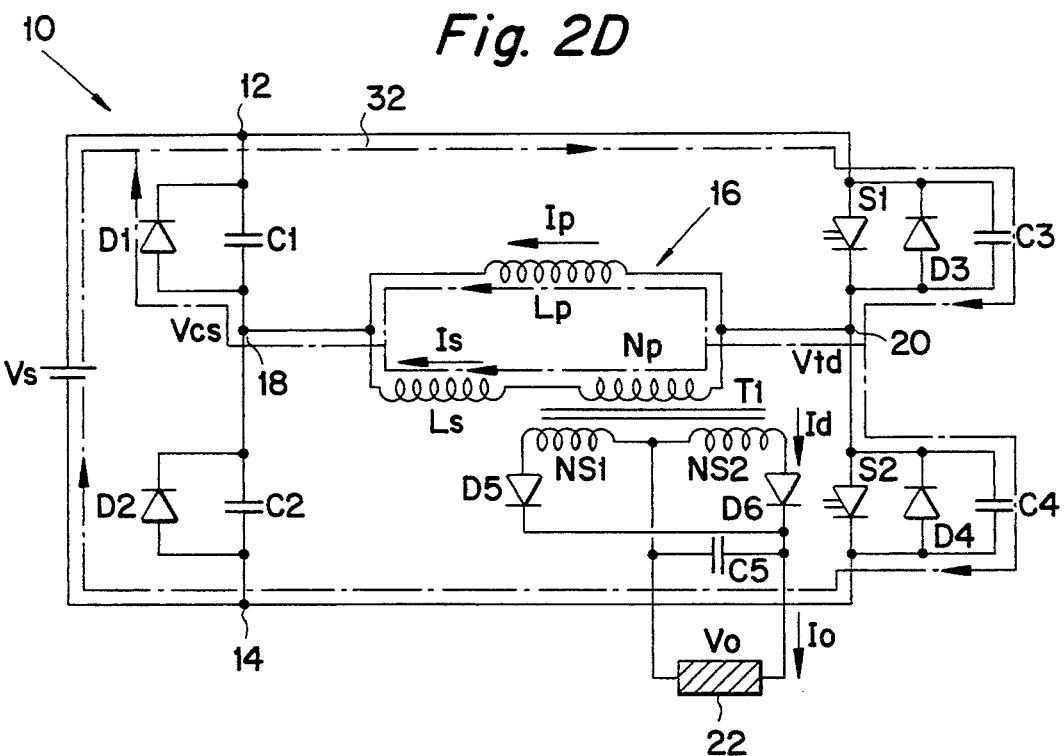

In FIG. 2D, a resonant transition interval, which immediately follows the turn-off of switch S1, is shown. The current path indicating the current flow which takes place during this interval is shown at 32. This interval is governed by the resonance between the inductive network 16 and the snubber capacitors C3 and C4. The turn-off losses of switch S1 are reduced by the snubber capacitor C3 retarding the voltage rise across the switch.

Figure 2E:
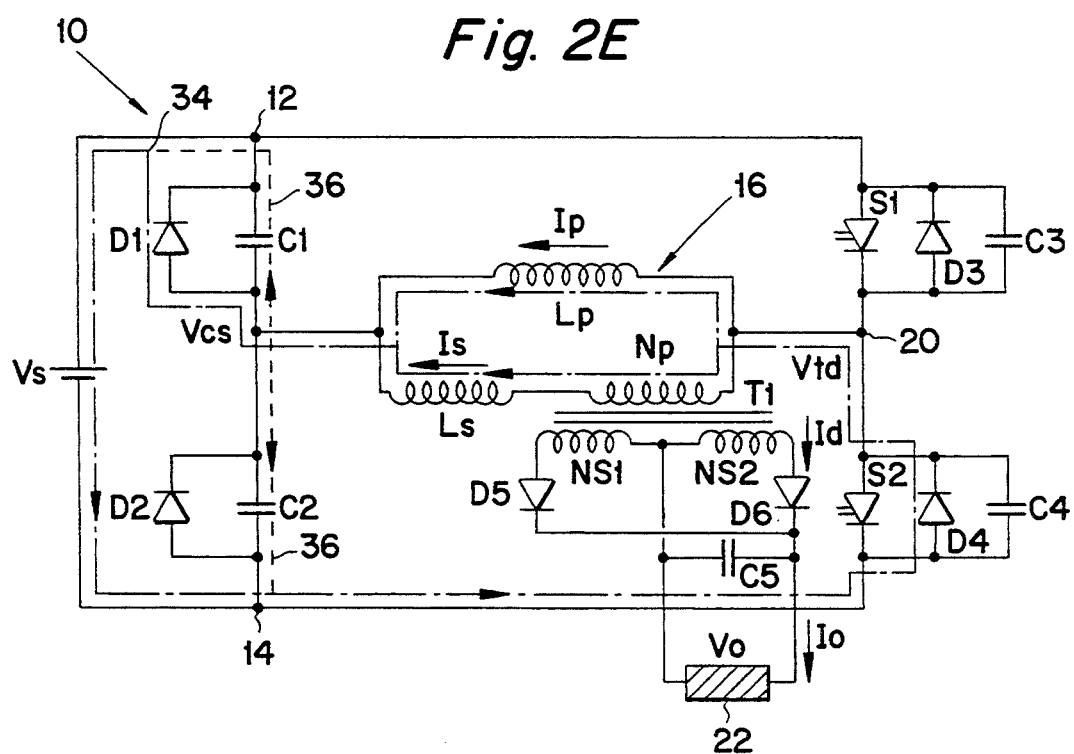
Figure 3A:
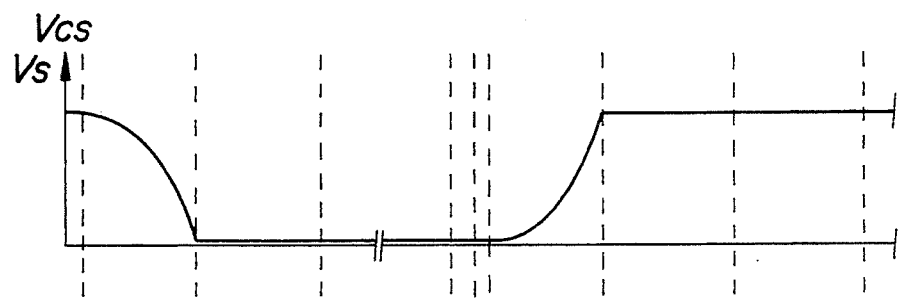
FIGS. 3A to 3D shows waveform diagrams illustrating one embodiment of a full operating cycle of the convertor corresponding to the intervals of FIGS. 2A to 2E under conditions of low output voltage.
Figure 3B:
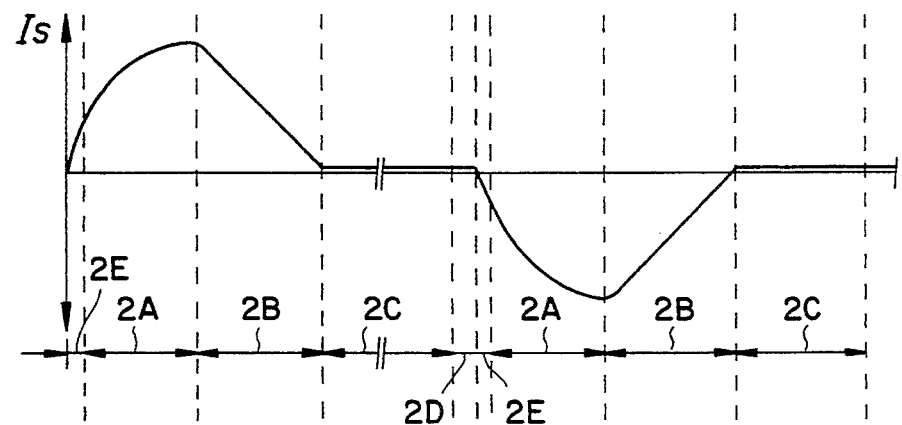
Figure 3C:
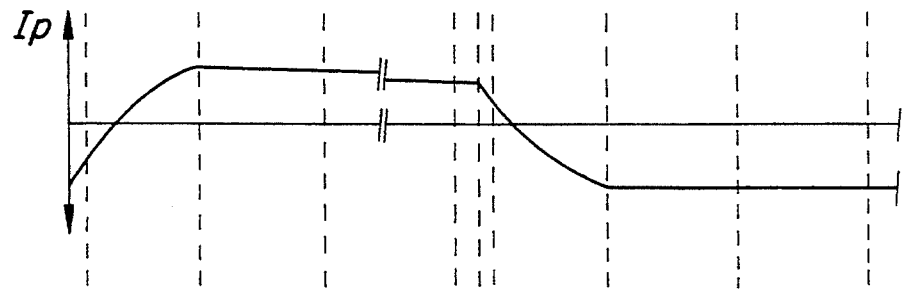
Figure 3D:
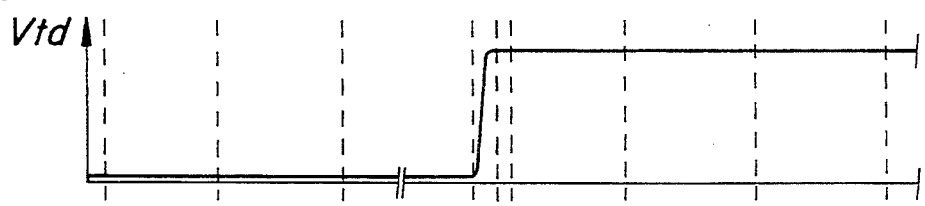

During the regenerative interval, which is illustrated in FIG. 2E, and in which current flow is indicated by line 34, part of the energy originally stored in the capacitor network is fed back to the supply Vs. This interval can be used to "trim" the circuit should excess energy be stored in the capacitor network. The regenerative interval can also be used to increase the switching frequency and to reduce the peak current through switches S1 and S2 at lower output voltages. In the same way, the switching frequency can be increased under low load conditions.

Turning now to FIGS. 3A to 3D, waveform diagrams are shown illustrating a first mode of operational of the convertor circuit. The waveforms are divided into various intervals which correspond to the intervals illustrated in FIGS. 2A to 2E, and are labelled accordingly. The resonant interval 2A commences shortly after turn-on of the switch S1, once there is a net positive flow of current through the switch S1 and the series and freewheel inductors Ls and Lp. During the resonant interval 2A, the voltage Vcs drops from the value close to the supply voltage Vs to a value approaching zero volts. The total current through the inductor network 16 which is made up of the sum of the currents Is and Ip, reaches a corresponding maximum value. The maximum value of the current Is is determined by the supply voltage Vs and the characteristic impedance of the resonant circuit comprising the collective capacitance of capacitors C1 and C2 and the combined inductance of the series inductor Ls and the freewheel inductor Lp.

During the discharge interval 2B, the inductor Ls discharges into the load. I the case of a low output voltage Vo the current level Is is governed by the conduction of the freewheel diode D1. During the freewheel interval 2C, which commences once the series inductor Ls has discharged completely, the current Ip is maintained by the freewheel inductor Lp. The current level decays gradually over the freewheel interval as it freewheels through the diode D1 and the switch S1 due to series resistance and the on-state voltages of the switch S1 and the diode D1.

Turn-off of the switch S1 takes place at the end of the freewheel interval 2C, while current Ip is still flowing through the switch S1. The snubber capacitor C3 retards the voltage rise across the switch S1, thereby reducing turn-off losses. During the resonant transition interval 2D, the voltage Vtd is governed by resonance between the freewheel inductor Lp and the snubber capacitors C3 and C4, and increases in a controlled manner to reduce turn-off losses as the current Ip from the freewheel inductor Lp charges up the snubber capacitors C3 and C4. At the end of this interval, the voltage Vtd has increased from close to zero to close to the supply voltage Vs. The maximum length of the freewheel interval 2C is determined by the minimum value of the freewheel current Ip which is required to achieve zero voltage turn-on of the switch S2 on the onset of the next half cycle.

Zero voltage turn-on of the switch S2 occurs during the regenerative interval 2E, during which part of the energy originally stored in the capacitor network is fed back to the supply. In this interval, the diode D4 conducts prior to turn-on of the switch S2, thereby ensuring that there is a negligible voltage drop across the switch S2 prior to turn-on. At turn-on of the switch S2 at the end of the regenerative interval, the combined currents Is and Ip decline to zero. Turn-on of the switch S2 signals the commencement of the resonant interval 2A of the next half cycle, during which switch S2 conducts. The various intervals 2A to 2E during this subsequent half cycle are identical, save that the waveforms during these intervals are of opposite polarity.

Turning now to FIGS. 4A to 4C, in the case of a high output load voltage Vo, the entire current waveform Is during a first part 2A1 of the resonant interval 2A is governed by the resonance between the combined capacitance of capacitors C1 and C2 and the combined inductance of the inductors Ls and Lp. During this interval, the voltage Vcs drops from a value close to the supply voltage Vs to a value between zero and the supply voltage Vs, and the series inductor Ls discharges completely. During a second part 2A2 of the resonant interval 2A, in which the resonance between the capacitance constituted by the capacitors C1 and C2 and the inductance of inductor Lp predominates, the voltage Vcs drops towards zero, the current Is remains at zero and the freewheel current Ip climbs to a maximum value, which it reaches at the onset of freewheel interval 2C. During freewheel interval 2C, both the voltage Vcs and the current Is remain close to zero and the freewheel current Ip decreases gradually over the interval as it freewheels through switch S1 and diode D1.

The maximum length of the freewheel interval 2C is determined by the minimum value of freewheel current Ip which is required to achieve zero voltage turn-on of switch S1 at the onset of the next half cycle.

A major advantage of operating the circuit in the manner illustrated in FIGS. 4A to 4C is that it provides an output voltage which can be up to twice that of a zero current switching series resonant convertor, and akin to a full bridge convertor. In the absence of the free wheel inductor Lp, at high output load voltage Vo, the voltage Vcs would stabilise at Vs/2, corresponding to the maximum voltage applicable across the nodes 18 and 20. The maximum output load voltage attainable would therefore be equal to Vs/2 multiplied by the transformer turns ratio. The freewheel conductor Lp has the effect of supplementing the series inductor Ls and allowing the voltage Vcs to swing between the supply voltage Vs and zero volts. With particular reference to FIGS. 4A to 4C, the inductor Lp is used to discharge the capacitors C1 and C2 completely during the sub-interval 2A2, after the series inductor has only dropped the voltage Vcs to an intermediate value.

Figure 5A:
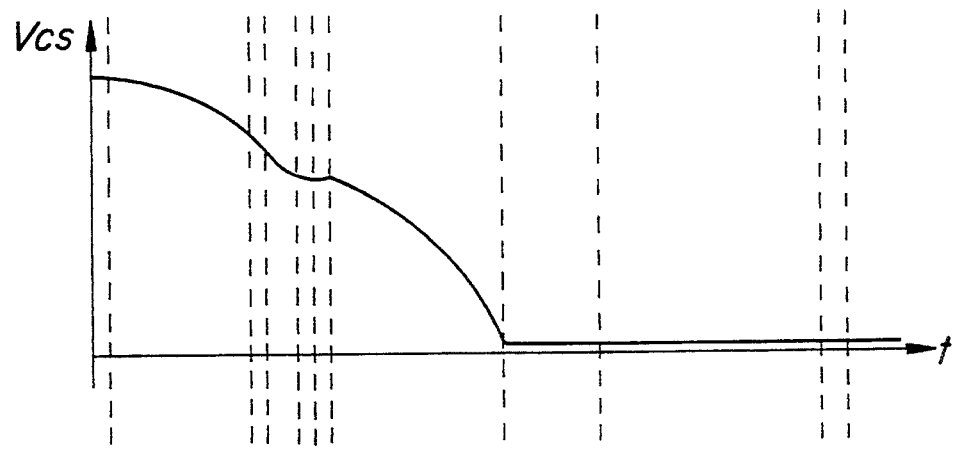
FIGS. 5A to 5C show waveform diagrams illustrating a still further embodiment of half of an operating cycle of the convertor.
Figure 5B:
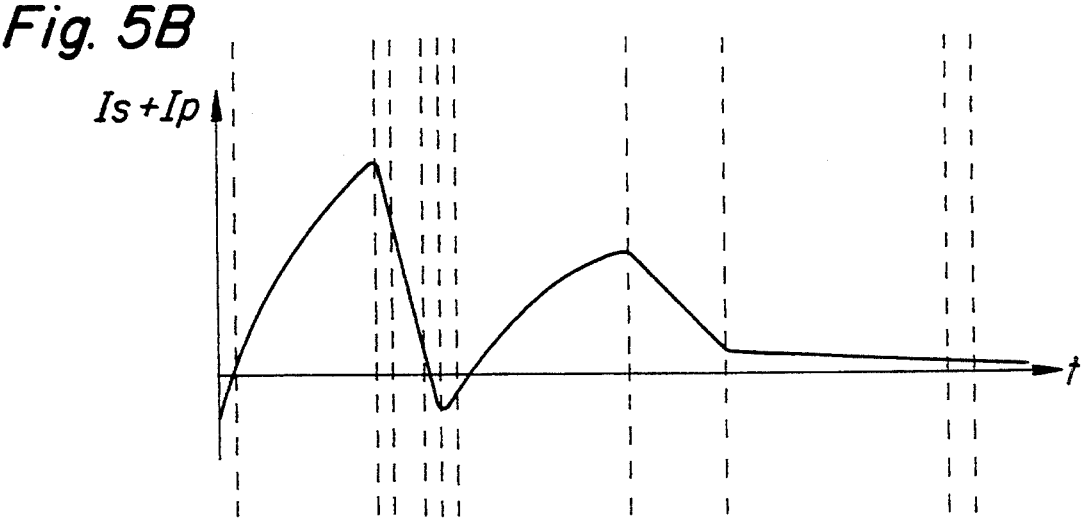
Figure 5C:
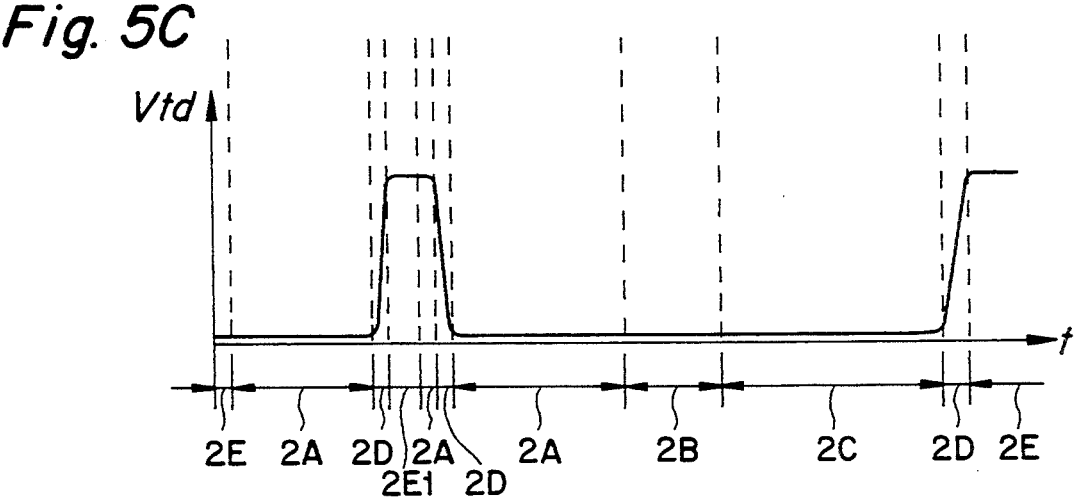

Referring now to FIGS. 5A to 5C, waveforms are shown indicating an alternative way of operating the convertor. The various intervals corresponding to the intervals illustrated in FIGS. 2A to 2E are indicated in the correct sequence on the waveform diagrams. During the resonant interval 2A, the switch S1 conducts. The switch S1 is turned off at the end of this interval on a rising current slope comprising the sum of the currents Is and Ip, and before Vcs reaches zero. Turn-off losses are higher than usual, but are contained owing the presence of the snubber capacitors C3 and C4.

The diode D4 conducts during a regenerative sub-interval 2E1. During the regenerative sub-interval 2E1, current flows through the capacitors C1 and C2, as is indicated in broken outline at 36, effectively trimming the capacitors by allowing them to discharge into the supply. When the combined currents Is and Ip reverse sign, the switch S2 is turned off and the original switch-diode pair S1 and D3 conduct again. The subsequent sequence of resonant, discharge, freewheel and resonant transition intervals 2A, 2B, 2C and 2D is essentially identical to the sequence of FIGS. 3A to 3D.

Referring now to the circuit in general, the average value of the output current Io over one half cycle is equal to the average value of the diode bridge current Id over one half cycle during steady state operation when the output voltage Vo is equal in value at the beginning and the end of a half cycle. Since Id is zero during the freewheel intervals 2C the length of these intervals affects the average current delivered to the load. An interval length of zero seconds therefore corresponds to a maximum load current, and by increasing these intervals, output current Io decreases for a given output voltage Vo.

In the case where the diode rectifier bridge D5 and D6 is absent and an AC load is powered, the r.m.s. current to the load is controlled in a similar manner by varying the length of the freewheel interval 2C.

In the case of the waveforms illustrated in FIGS. 3A to 3D, the output current Io can further be controlled by setting the freewheel interval 2C equal to zero and varying the duration of discharge interval 2B. The output current Io at a given output voltage value Vo is therefore controlled by varying the interval length of the drive signals controlling operation of the switches S1 and S2. The conduction intervals of the switches S1 and S2 are sufficiently long so as to ensure that full excursion of the supply voltage at the node 18 between the capacitors C1 and C2 is achieved. Essentially, the output current Io at a given output voltage Vo is controlled by varying the interval length of the signals which drive the controlled switches.

In the case of both high and low output voltages Vo, the freewheel intervals 2C only commence once both the voltage Vcs and the current Is have approached zero values. In the case of a low output voltage, the current Is approaches a zero value after the voltage Vcs subsequent to discharge of the inductor Ls into the load. In the case of a high output voltage Vo, the resonance between the capacitors C1 and C2 and the freewheel inductor Lp predominates during the resonant interval 2A, leading to a more gradual stepped decay in the voltage Vcs.

It must be appreciated that the schematic circuit diagram of FIG. 1 represents only a single convertor and that a number of convertors may be connected in series or parallel in order increase the total output power available. When several convertors are linked together, the input power factor can be improved and the size of the input filters can be reduced by applying phase shift to the drive signals from switches S1 and S2 in the different convertors.

In a further embodiment of the invention, multiple secondary networks may be provided to supply a plurality of DC loads, each network comprising a secondary winding, a rectifier bridge and one or more additional inductors between the secondary winding and the diodes of the rectifier bridge. The inductor Ls may also be placed in series with the secondary windings $N_{s1}$ and $N_{s2}$ of the transformer T1 rather than with the primary winding Np.

As a further alternative, the transformer may have a single secondary winding NS coupled to a full four diode rectifier bridge.

The inductor Lp may also be placed in parallel only with primary winding Np rather than both with primary winding Np and with inductor Ls, in which case it would be in series with inductor Ls.

The inductive network 16 comprising the inductors Lp and Ls and the transformer T1 can be combined into one or two integral magnetic structures. In one version of the convertor, the separate freewheel inductor Lp is replaced by the magnetising inductance of the transformer, and the series inductor Ls is replaced by the leakage inductance of the transformer. The leakage inductance and the magnetising inductance may be varied by inserting airgaps in the magnetic core. The inter-turn capacitance of the various components in the inductive network 16, as well as the inherent capacitance of the controlled switches S1 and S2 may be used to assist the snubber capacitors C3 and C4.

An advantage of using the freewheel diode D1 and D2 is that the voltage across the input capacitors C1 and C2 is limited to Vs, which reduces the stresses on the capacitor and limits the peak current which goes through the switches. In addition, energy is transferred at fixed energy pulses having a magnitude $CVs^2$. The power output is controlled by varying the rate or frequency of these energy pulses. Finally, the conventional series resonant convertor has complicated state plan behaviour. The state plan trajectory is restricted when using the clamping diodes D1 and D2, thereby enhancing the robustness of operation and simplifying control of the circuit.

The primary advantage of the convertor circuit of the invention is that it allows for zero voltage switching of the semi-conductor switches at a switching frequency which is below the resonant frequency of the series-resonant circuit. The resonant frequency of the tank, or series resonant circuit, is typically from 40 kHz to 120 kHz in the kilowatt power range. The switching frequency is typically from 1 kHz to the resonant frequency, but can be as low as 2 Hz. This is achieved by virtue of the parallel freewheel inductance, in combination with the snubber capacitors and the clamping diodes.

The snubber capacitors also significantly reduce turn-off losses of the switches. The circuit can therefore operate at relatively high frequencies using comparatively modest switching devices. The reason for this is that the frequency of operation is neither constrained by switching losses nor by switches having relatively long transition intervals. A high operating frequency has the natural advantage of utilizing a relatively small and compact resonant tank. The reduction in size of the reactive components and the transformer arising from high operating frequency will naturally tend to a reduction in costs.

I claim:

1. A series-resonant convertor circuit comprising:
   a) a resonant energy transfer tank including a capacitive energy storage network coupled to an inductive energy storage network for transferring energy from a power source to a load, the load being arranged to receive all of its energy via the resonant energy transfer tank;
   b) a current switching network comprising first and second controlled switches for alternately switching the convertor circuit between discrete successive energy transfer cycles;
   c) passive voltage clamping means for controlling the magnitude and polarity of the voltage across the capacitive energy storage network;
   d) a series discharge inductance arranged and rated to discharge completely through the load during discrete successive energy transfer cycles; and
   e) a freewheel inductance shunted across the series discharge inductance and being arranged and rated relative to the series discharge inductance to sustain free wheel current after discharge of the series discharge inductance for allowing zero voltage turn-on and reduced current turn-off of the controlled switches at a switching frequency which is less than the resonant frequency of the resonant energy transfer tank.

2. A convertor circuit according to claim 1 in which the passive voltage clamping means, in combination with the freewheel inductance and a selected one of the controlled switches, defines a freewheel network for allowing circulation of the freewheel current during a variable interval between the discrete successive energy transfer cycles.

3. A convertor circuit according to claim 2 which includes first and second snubber capacitors shunted across the respective first and second controlled switches for reducing turn-off switching losses, the freewheel inductance being arranged to discharge into the first and second snubber capacitors during sequential resonant transition intervals just prior to turn-on of the first and second controlled switches for equalizing the voltage across the switches and allowing zero voltage turn-on.

4. A convertor circuit according to claim 1 in which the freewheel inductance is arranged to supplement the series inductance in completely discharging and charging the capacitive energy storage network over each cycle of operation, thereby to allow complete excursion of a supply voltage across the inductive energy storage network.

5. A convertor circuit according to claim 3 in which the capacitive energy storage network comprises first and second capacitors arranged in series across input terminals of the power source and being coupled to the inductive energy storage network at a node located between the capacitors, and the voltage clamping means comprises first and second respective clamping diodes shunted across each capacitor.

6. A method of using a series resonant convertor in the transfer of energy from a power source to a load, the convertor comprising a resonant energy transfer tank including a capacitive energy storage network which includes voltage clamping means shunted across the network, the capacitive energy storage network being coupled resonantly to an inductive energy storage network which includes a freewheel inductance shunted across a series inductance and a current switching network having a pair of controlled switches arranged to switch the convertor circuit between discrete successive energy transfer cycles at a switching frequency which is less than the resonant frequency of the resonant energy transfer tank, one cycle including:
   a) a resonant interval during which the capacitive energy storage network discharges into the inductive energy storage network and the load;
   b) a freewheel interval, during which freewheel current discharged from and sustained by the freewheel inductance circulates around a predetermined freewheel current path incorporating one of the controlled switches and the voltage clamping means;
   c) a resonant transitional interval, during which the freewheel current is discharged into a capacitance existing across the other controlled switch for facilitating zero voltage turn-on of the other switch.

7. A method of claim 6 in which one cycle further includes a regenerative interval, in which energy stored in the inductive network is fed back to the supply for increasing switching frequency and for reducing current through the controlled switches.

8. A method according to claim 6 in which the one cycle further includes a discharge interval, in which that part of the energy stored in the inductive energy storage network which is stored in the series discharge inductance discharges into the load.

9. A series-resonant convertor according to claim 5 in which the freewheel network includes a first freewheel sub-circuit incorporating the freewheel inductance, the first voltage clamping means and the first-controlled switch for circulating sufficient freewheel current during a variable interval between the discrete successive energy transfer cycles for allowing zero voltage turn-on of the second controlled switch.

10. A series-resonant convertor circuit according to claim 9 further comprising a second freewheel sub-circuit incorporating the freewheel inductance, the second voltage clamping means and the second controlled switch for circulating sufficient freewheel current during a variable interval between the discrete successive energy transfer cycles for allowing zero voltage turn-on of the first controlled switch.

11. A series-resonant convertor according to claim 5 in which the discrete energy transfer cycles are proportional to $CV_s^2$, where C is the capacitance of the capacitors and $V_s$ is the voltage of the power source.

* * * * *